United States Patent
Brumagim

[11] 3,824,968
[45] July 23, 1974

[54] ROTARY INTERNAL COMBUSTION ENGINE

[75] Inventor: Ivan S. Brumagim, North Warren, Pa.

[73] Assignee: Secondary Processing Systems, Inc., Warren, Pa.

[22] Filed: Sept. 7, 1972

[21] Appl. No.: 286,972

[52] U.S. Cl............... 123/8.45, 418/31, 418/266, 418/267, 418/268, 418/269, 123/8.07
[51] Int. Cl............................. F02b 55/14
[58] Field of Search................... 123/8.45

[56] References Cited
UNITED STATES PATENTS
| | | | |
|---|---|---|---|
| 719,634 | 2/1903 | Austin | 418/31 |
| 1,841,841 | 1/1932 | Munn | 123/8.45 |
| 3,036,560 | 5/1962 | Geiger | 123/8.45 |

FOREIGN PATENTS OR APPLICATIONS
| | | | |
|---|---|---|---|
| 629,349 | 3/1963 | Belgium | 123/8.45 |

Primary Examiner—Clarence R. Gordon

[57] ABSTRACT

A rotary internal combustion engine consisting of a rotor housed within a stator forming one or more dual purpose compression and combustion chambers, the inner periphery of said chamber being a sector of said rotor, its ends being hinged to said rotor in such manner that both the compression and firing of the fuel forces said ends into pressure tight contact with the inner surface of said stator, its outer periphery being formed by said inner surface, the contour of said inner surface being adapted to twice maximize and twice minimize the volume of each said chamber at each revolution of the rotor, thereby providing within each chamber a succession of induction, compression, combustion, expansion and exhaust of fuel at each revolution of the rotor, said rotor being adapted by means of a groove along its surface to transfer the gases thus inducted and compressed in the compression chamber to a point of ignition provided at the beginning of the expansion chamber.

13 Claims, 16 Drawing Figures

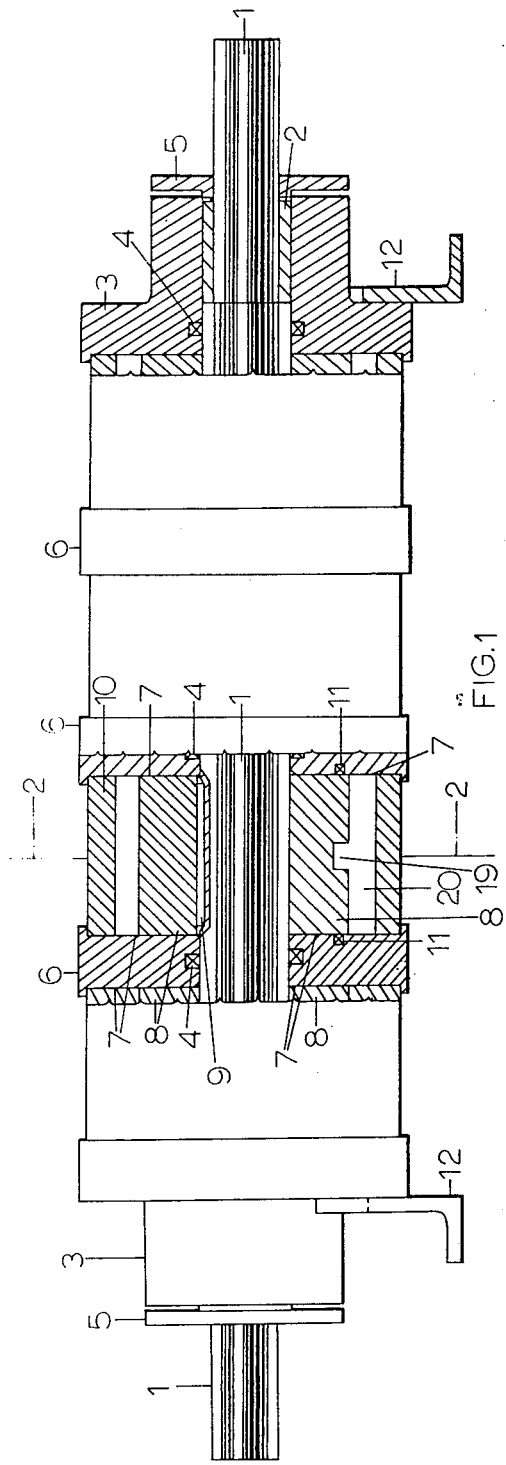
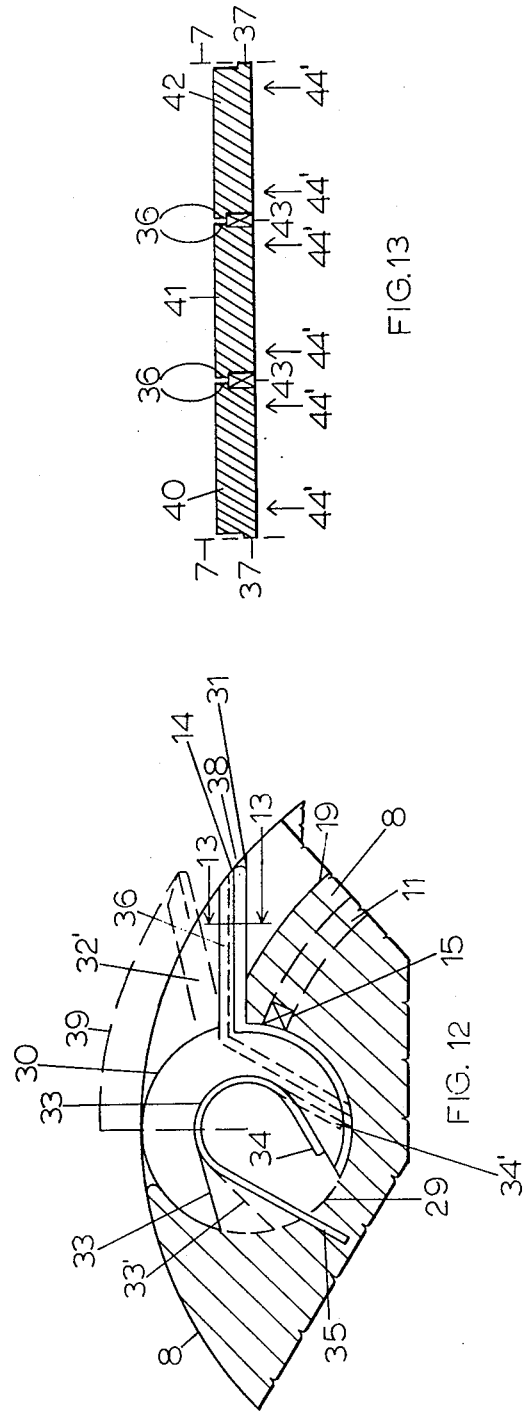

3,824,968
SHEET 2 OF 3
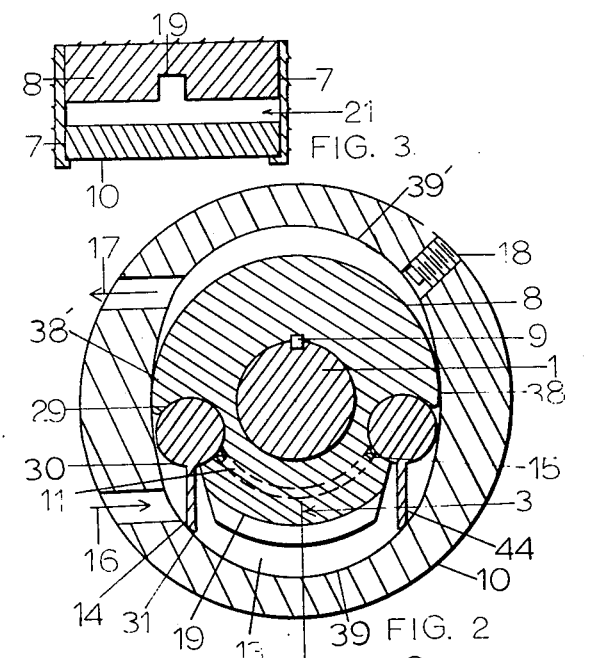
FIG. 3
FIG. 2
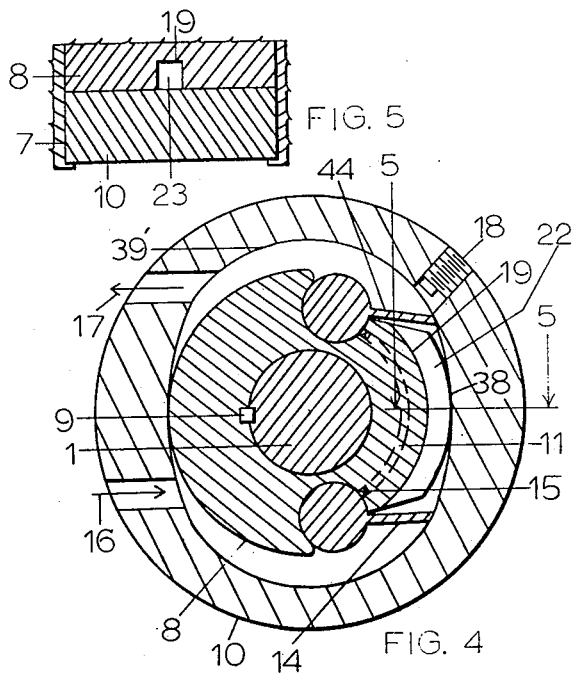
FIG. 5
FIG. 4
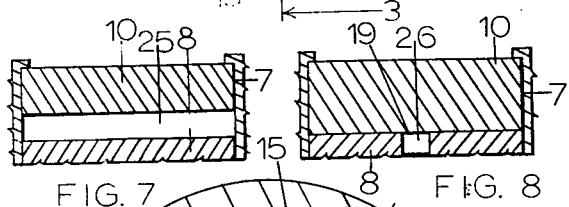
FIG. 7  FIG. 8
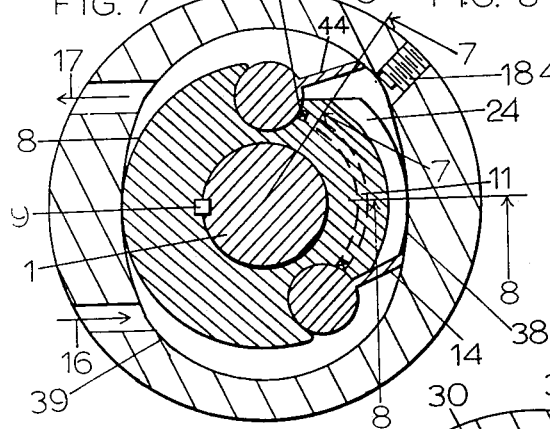
FIG. 6
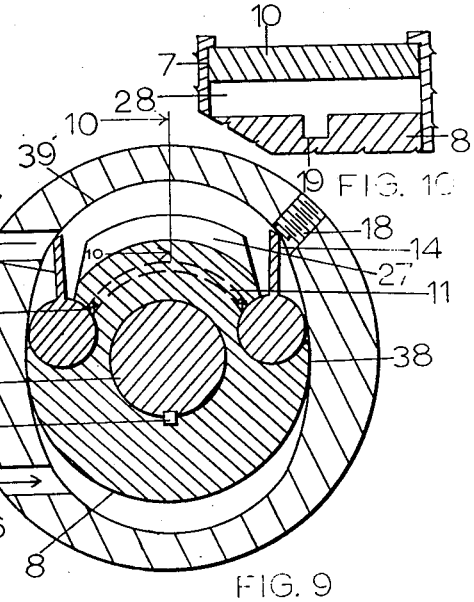
FIG. 10
FIG. 9
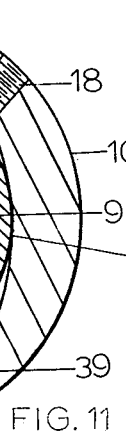
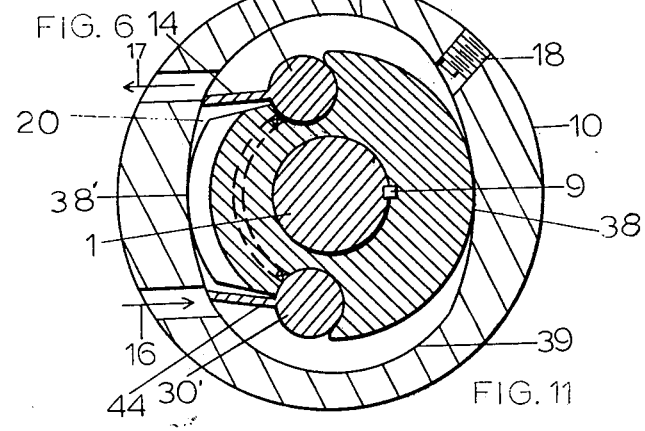
FIG. 11

3,824,968

ROTARY INTERNAL COMBUSTION ENGINE

REFERENCE TO PRIOR ART

A rotary engine of the type shown in the U. S. Pat. No. 3,487,815 is disclosed herein.

OBJECTS OF THE INVENTION

The apparatus disclosed herein relates to internal combustion engines and has as its main object the provision of a rotary engine which performs the full cycle of fuel induction, compression, combustion, expansion and exhaust during one revolution of a single rotor, mounted on a single concentric shaft and functioning within a single rotor housing. A further object of this invention is to provide a rotary engine in which the ellipsoidal inner contour of the inner surface of the stator, the outer surface of the rotor and a pair of facing hinged ends combine to form a compression chamber and alternately a combustion chamber, the volume of which, as the rotor turns within the stator, are maximized and minimized.

A further object of this is to provide means by which the gases compressed in the compression chamber are transferred in a groove on the surface of the rotor to the point of ignition at the beginning of the expansion chamber.

A further object of this invention is to provide a rotary engine which the compression ratio may be predetermined over a wide range.

A further object of this invention is to provide a rotary engine in which one or more rotors can be mounted on a single shaft.

A further object of this invention is to provide a rotary engine in which the apertures between the rotor parts and the housing elements are closed by the pressure generated by the compression of the fuel and the expansion produced by the fuel combustion.

With the above and other objects in view, the present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a side view in partial section showing a four cylinder concept of said rotary engine.

FIG. 2 is a cross section taken on line 2—2 of FIG. 1 showing a rotor within an out-of-round stator adapted to form a chamber there between, said chamber, hereinafter called the operating chamber, is formed by the rotor, chamber end plates hinged to said rotor and the inside surface of said housing. Said operating chamber is positioned at the point of completion of fuel intake and the beginning of fuel compression. At this approximate point the length and depth of the operating chamber are maximum.

FIG. 3 is a sectional view taken on line 3—3 of FIG. 2 showing the maximum width and depth of the operating chamber which occurs at this position of the rotor.

FIG. 4 is a cross sectional view similar to FIG. 2 showing the operating chamber positioned at the aproximate point of maximum fuel compression.

FIG. 5 is a cross sectional view taken on line 5—5 of FIG. 4 showing the fuel compressed into the transfer groove provided along the surface of the rotor.

FIG. 6 is a cross sectional view similar to FIG. 2 with the operating chamber positioned at the aproximate point of fuel ignition.

FIG. 7 is a cross sectional view taken on line 7—7 of FIG. 6 showing graphically the surface actuated in a counter clockwise direction by the expansion of the ignited fuel.

FIG. 8 is a cross sectional view taken on line 8—8 of FIG. 6 showing graphically the surface actuated in a clockwise direction by the expansion of the ignited fuel.

FIG. 9 is a cross sectional view similar to FIG. 2 with the operating chamber again at maximum length and depth when positioned at approximate point of complete expansion which occurs about 90° from the point of ignition.

FIG. 10 is a cross sectional view taken on line 10—10 of FIG. 9 showing the maximum width and depth of the operating chamber which occurs at this position of the rotor. Each said chamber functions through the succession of induction, compression, conbustion, expansion and exhaust at each revolution of the rotor.

FIG. 11 is a sectional view similar to FIG. 2 with the operating chamber positioned at the point of completion of exhaust of burned fuel and the beginning of the intake of new fuel.

FIG. 12 is a partial end view of the hinged chamber end showing the arrangement of the spring which forces the contact of said chamber end with the inside contour of the housing and the means of selling the rotor within the cylinder side walls and between the rotor and the hinged chamber end.

FIG. 13 is a cross section taken on line 13—13 in FIG. 12 showing the chamber end divided into three lengths with resilient heat resisting materials positioned between the middle and end lengths, and means to provide reduced areas of metal to metal contact between the end lengths and the cylinder side walls.

DETAILED DESCRIPTION OF THE DRAWINGS

Figure 14:
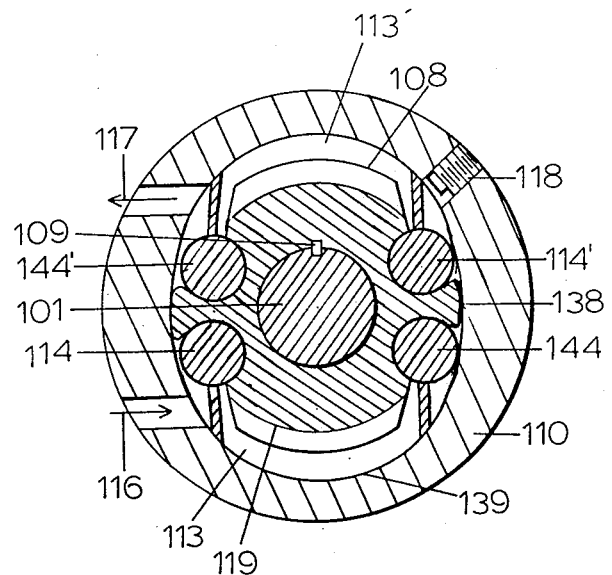
FIG. 14 shows another embodiment of the rotor mounted on shaft as shown in FIG. 2 except two diametrically opposite operating chambers are defined by the rotor instead of the single chamber shown in FIG. 2. In this way it also shows a multiplicity of operating chambers mounted on a single rotor.

The engine illustrated in FIG. 1, which may be a single or multiple unit machine, comprises a shaft 1, mounted in bearings 2, carried in end housings 3. Shaft 1 is sealed by closures 4. Bearings 2 are removably held in place by retainers 5. When more than one unit is used, separator plates 6 are provided in addition to end housings 3. The apertures between separator plates 6 and shaft 1 are sealed by closures 4. The assembly consisting of rotor 8, shaft 1 and key 9 rotates with stator 10. Closure 11 seals the apertures between rotor 8 and faces 7. The engine is supported by base plates 12. In the preferred embodiment rotor 8 is in the form of a cylinder having a peripheral groove 19. Operating chamber 20 is more fully described by reference to the following descriptions of cross sections.

FIG. 2 is a cross section of FIG. 1 taken along line 2—2, in which shaft 1, rotor 8 and key 9 rotate within stator 10. The inside of stator 10 is contoured to alternately form sectors 38 and 38' having a close-running fit on rotor 8 followed by a sectors 39 and 39' having maximum clearance with rotor 8. Hinged plates 14 and 44 are integrally fixed to barrels 30 and 30' and are rotatably fixed in rotor 8 and are forced to follow the inner surface of stator 10 by internal springs shown in FIG. 12 and described later herein.

Hinged plates 14 and 44, rotor 8, the faces 7 of separator plates 6 and the inner surface of stator 10 combine to form the operating chamber 20 of varying length and depth as rotor 8 turns within the changing contour of the inner surface of stator 10. The chamber 20 indicated by the area 13 has a maximum volume as the rotor 8 passes through the sector 39. This maximum occurs at the point of completion of fuel intake and the beginning of fuel compression. Closure 15 seals the aperture between the barrels of hinge plates 14 and 44 and rotor 8. Closure 11 seals the aperture between the ends of rotor 8 and the faces 7 of separator plates 6. Inlet 16 is the point of fuel intake. Outlet 17 is the point of exhaust. A groove 19 is machined into rotor 8. The fuel is compressed into groove 19 and carried by the rotation of rotor 8 to ignition point 18. Combustion begins to occur at ignition point 18.

FIG. 3 is a cross section taken along line 3—3 in FIG. 2 to show the maximum width and depth of the operating chamber 20 as area 21 which includes groove 19. This occurs at the beginning of fuel compression.

FIG. 4 is a cross section identical with FIG. 2 except rotor 8 is positioned 90° counter clockwise from the position shown in FIG. 2. At this position rotor 8 operates in close tolerance with the inner surface of stator 10. The operating chamber 20 thus enclosed by hinged plates 14 and 44, rotor 8 and groove 19, and the inner surface of stator 10 is shown as area 22. The operating chamber 20 has its minimum volume as rotor 8 passes through the sector 38 of stator 10 contoured to a running fit on rotor 8, just previous to ignition point 18. Groove 19 which constitutes the major part of the chamber 20 receives the compressed fuel and as rotor 8 turns, it carries said fuel to ignition point 18.

FIG. 5 is a cross section taken along line 5—5 in FIG. 4 to show the minimum width and depth of the operating chamber 20 indicated as area 23. This is the point of maximum fuel compression. Groove 19 and chamber 20 are substantially identical.

FIG. 6 is a cross section identical with FIG. 4 except rotor 8 and the operating chamber 20 are positioned a few degrees counter clockwise to the position shown in FIG. 4, that is at a point just counter clockwise to ignition point 18. The operating chamber 20 indicated as area 24 is shown subsequent to the ignition of the fuel.

FIG. 7 is a cross section taken along line 7—7 of FIG. 6 to show graphically the width and depth of the net area 25 actuated in a counter clockwise direction by the expansion of the ignited fuel.

FIG. 8 is a cross section taken along line 8—8 of FIG. 6 to show graphically the width and depth of area 26, actuated in a clockwise direction by the expansion of the ignited fuel.

FIG. 9 is a cross section identical to FIG. 4 except the operating chamber is positioned 90° counter clockwise to the position shown in FIG. 4. Operating chamber 20 indicated as area 27 is at a maximum volume as rotor 8 passes through sector 39' and the ignited fuel completely expands. The arc of rotation necessary to accommodate such expansion is about 90°.

FIG. 10 is a cross section taken along line 10—10 in FIG. 9 to show the width and depth of the operating chamber 20 indicated as area 28 at the point of full fuel expansion.

FIG. 11 is a cross section identical to FIG. 9 except the operating chamber 20 is positioned 90° counter clockwise to the position shown in FIG. 9 at which point the exhaust is completed and the intake of fuel begins.

FIG. 12 is a partial end view of the assembly of the rotor 8. The rotor 8 is fixed to shaft 1 by key 9, barrels 30 and 30' having hinged plate 14 integrally attached in place in cylindrical slot 29 drilled in rotor 8. In addition to slot 29, the periphery of rotor 8 is milled away along line 31 making space for the free movement of hinged plate 14. Line 19 indicates the bottom of groove 19 cut along the periphery of rotor 8 between lines 31. Packing 15 seals the aperture between barrels 30 and 30' and rotor 8 and faces 7 of separator plates 6 as shown in FIG. 1. Barrel 30 slips into rotor 8 at slot 29. A section 33 is cut out of barrel 30 to accommodate the assembly of spring 34. Spring 34 actuates barrel 30 in a counter clockwise direction forcing the tip of plate 14 in contact with stator wall 10 at sector 38. Area 36 is a projection at the far edge of plate 14. The elements of hinged plate 14 shown in solid lines indicate its position when fully depressed by the inner contour of stator wall 10 at point 38. Identical elements identified as plate 32', barrel 30, section 33' and spring 34' are shown in broken lines to show their positions when released by the inner contour of stator 10 in sector 39.

FIG. 13 is a cross section taken along line 13—13 of FIG. 12, to show hinged plate 14 made up of three lengthwise parts by which plate 14 (FIG. 13) becomes plate section 40, plate section 41 and plate section 42. These plate sections are separated by resilient packing 43. The directional force 44' of either the compression of fuel or expansion from fuel combustion is indicated by arrows 44'. This force 44' tends to compress packing 43 urging plates 40 and 42 toward faces 7 of separation plates 6. Projections 36 on plates 40, 41 and 42 holds packing 43 in place between plate section 41 and 40 and 41 and 42. Projections 37 on plate sections 40 and 42 provide a narrow strip of metal to metal seal between said plate sections 40 and 42 and faces 7.

FIG. 14 shows rotor 108 mounted on shaft 101, said rotor defining the two diametrically opposite operating chambers 113 and 113' with said chamber 113 defined on two sides by plates 114 and 144, with said chamber 113' defined on two sides by plates 114' and 144'.

Figure 15:
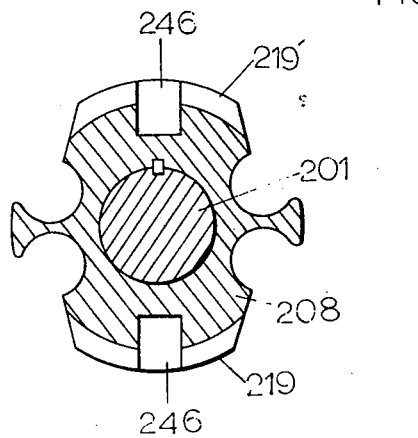
FIG. 15 is an embodiment of the rotor shown in FIG. 14 with a channel in both peripheral grooves for added chamber volume.

FIG. 15 shows a rotor 208 with axial channels 246 and 246' for added volume.

Figure 16:
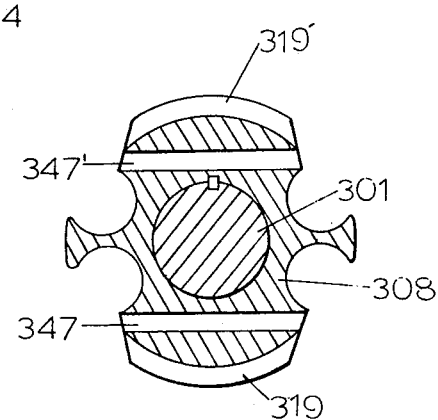
FIG. 16 is another embodiment of the rotor shown in FIG. 14 with interior channels.

FIG. 16 shows a rotor 308 and with interior channels 347 and 347' together with grooves 319 and 319'.

The operation of the motor now will be explained. With rotor 8 rotating in a counter clockwise direction starting at the position shown in FIG. 11, spring loaded barrel 30' leaves the confined sector 38' and moves along the enlarged sector 39 thereby increasing the length and depth or volume of said operating chamber 20 contained between hinged plates 44 and 14 causing fuel to be drawn into chamber 20 through intake 16. The enlarged size of chamber 20 at the completion of fuel intake is indicated as area 13, FIG. 2. Hinged plate or valve 14 now closes intake 16 to chamber 20, thereby confining the fuel between plates or valves 14 and 44. Hinged plate 44 enters confined sector 38 and hinged plate 14 compresses the fuel as rotor 8 approaches the position shown in FIG. 4. The volume of chamber 20 indicated as area 22 is decreasing in FIG. 4. The volume of chamber 20 is substantially the volume of groove 19, which is machined into rotor 8 for the purpose of receiving and moving the compressed fuel to ignition point 18. The compression ratio of the motor is predetermined by the determination of the width and depth of groove 19. As hinged plate 44 passes ignition point 18 ignition occurs. The position of the rotor at ignition is shown in FIG. 6. At this point chamber 20 is shown by area 24. The relative areas of impact counter clockwise versus clockwise are overpoweringly counter clockwise. The area of impact from the ignition of fuel actuating rotor 8 in a counter clockwise direction is shown graphically as area 25, FIG. 7. The area actuating rotor 8 in a clockwise direction is shown as area 26, FIG. 8. As the fuel expands in chamber 20 indicated as area 24 it thrusts hinge plates 14 and 44 and rotor 8 to the position shown in FIG. 9 at the beginning point of exhaust through outlet 17. This arc of thrust is about 90°. As rotor 8 continues and completes its cycle to the beginning position shown in FIG. 11, hinged plate 14 sweeps the exhausted fuel from area 27, FIG. 9.

Each adjoining barrel and plate structure sometimes referred to as a hinged chamber end functions as a valve. For example, plates 14 and 44 supported on barrels 30 and 30' operate as valves.

In the four stator concept shown in FIG. 1, the individual rotors 8 are mounted at 90° from each other to give a point of ignition at each quarter turn of shaft 1.

By these means the objects of this invention are accomplished. A full cycle of fuel intake, fuel compression, fuel ignition, power and fuel exhaust is provided by means of a single rotor mounted on a common concentric shaft rotating within a single housing. The machine may be single or multiple stator, and a wide range of compression ratios is possible. The pressures generated by the compression of the fuel and its combustion are directed to close the apertures between the rotor parts and the housing elements.

It should be understood that the foregoing describes a specific embodiment of the invention and that numerous modifications and alterations may be made therein without departing from the spirit and scope of the invention as set forth in the following claims.

The embodiments of the invention in which an exclusive property or privilege is claimed are defined as follows:

1. A rotary engine comprising
   a concentric shaft,
   a rotor,
   a stator,
   said stator having an inner surface having a minor diameter and a major diameter and defining a space adapted to form alternatively a sector having a close fit on said rotor followed by a sector having a substantial clearance with said rotor,
   said rotor being generally cylindrical and having a diameter substantially equal to the minor diameter of said stator,
   operating chambers consisting of said space between said rotor and said stator adapted to be consecutively compression and expansion chambers,
   said chambers being essentially integral with said rotor,
   said chambers having opposing hinged ends in a corresponding position from the center of the chambers,
   said hinged ends being forced outwardly by springs to make a continuous initial pressure seal with the inner contour of said stator,
   the angle of repose between the said rotor and the inner face of either of said opposing hinged ends is adapted to be an acute angle of 45° maximum,
   the said opposing hinged ends being adapted to slope toward each other at the said acute angles whereby the said continuous initial pressure seal is increased by the internal pressure within said chamber to maintain said seal at all pressures within said chambers,
   the said opposing hinged ends of said chambers being hinged to said rotor whereby its outer periphery is the inner wall of said chambers,
   the outer wall of said chambers is the inner surface of said stator,
   the sides of said chambers are the lateral walls of said space,
   and an opening along the outer periphery of said rotor within said operating chamber being adapted to receive the gas compressed within the compression chamber and transfer said gas across the close fitting sector of the stator to the point of ignition at the beginning of the expansion chamber.

2. The rotary engine recited in claim 1 wherein the opening along the outer periphery of the rotor within said operating chamber is predetermined in size and shape to provide the desired compression ratio of the fuel.

3. The rotary engine recited in claim 1 wherein a plurality of rotor and stator assemblies are mounted on a single shaft.

4. The rotary engine recited in claim 1 wherein means is provided to urge the tips of the hinged ends of the operating chamber in contact with the inner surface of said enclosure by resilient means located remote from the heat of the operating chamber.

5. The rotary engine recited in claim 1 wherein the said hinged ends are made in multiple lengths, said lengths being separated by resilient packing with said packing retained between said lengths in a manner that the force of compression and expansion urge the end lengths of said hinged end into firm contact with the walls of said rotor housing.

6. A rotary engine comprising a rotor and a stator and two valves,
   said valves being swingably attached to the outer periphery of said rotor and defining a space therebetween,
   said stator having a space therein generally non-circular shaped in cross section,
   said rotor being generally cylindrical in cross section and having a diameter substantially equal to the minor diameter of said stator enclosure, said valves comprising rigid plates swingably attached to said rotor adjacent the periphery of said rotor and extending generally parallel to the axis of rotation of said rotor, said valves being swingable toward each other and of sufficient length of the ends of said valves to engage said stator during an entire rotation of said rotor, said valve ends being forced into engagement with said stator surface by the pressure of combustion gases throughout a complete revolution of said rotor, and means for urging said plates in contact with said stator whereby an operating chamber is defined between said plates, said rotor and said stator, and means for introducing fuel into said combustion chamber and to ignite said fuel, said opening defining a part of a combustion chamber.

7. The engine recited in claim 6 wherein said rotor has a circumferentially extending groove formed in the periphery thereof extending between said plates.

8. The engine recited in claim 6 wherein said rotor has a cavity formed in the periphery thereof extending between said plates.

9. The engine recited in claim 6 wherein said rotor has axially and tangentially flat extending surfaces thereon and said platelike valves are disposed generally parallel to said surfaces when said valves pass the minor diameter of the inner periphery of said stator.

10. The engine recited in claim 9 wherein said platelike valves are swingable attached to said rotor by generally cylindrical shaped barrels disposed in complimentary shaped bores in said rotor.

11. The engine recited in claim 5 wherein said stator has a fuel intake opening and an exhaust opening, said openings being spaced from each other and disposed along one side of said stator.

12. The engine recited in claim 11 wherein said rotor is supported in said stator by means of a shaft.

13. The engine recited in claim 12 wherein a plurality of said rotors are supported on said shaft, and a plurality of said stators are disposed around said rotors.

* * * * *